Dec. 23, 1958
P. J. BORDENAVE ET AL
2,865,196
APPARATUS FOR MEASUREMENTS CONCERNING THE
VELOCITY OF PROPAGATION OF WAVES, AND
IN PARTICULAR SOUND WAVES
Filed Dec. 13, 1956
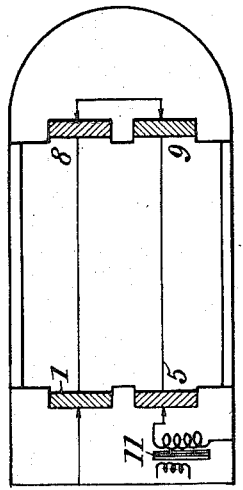
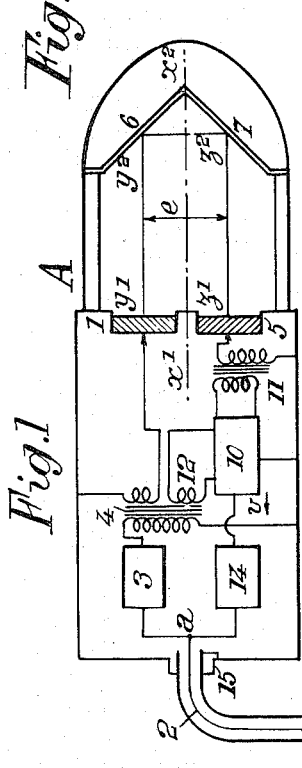
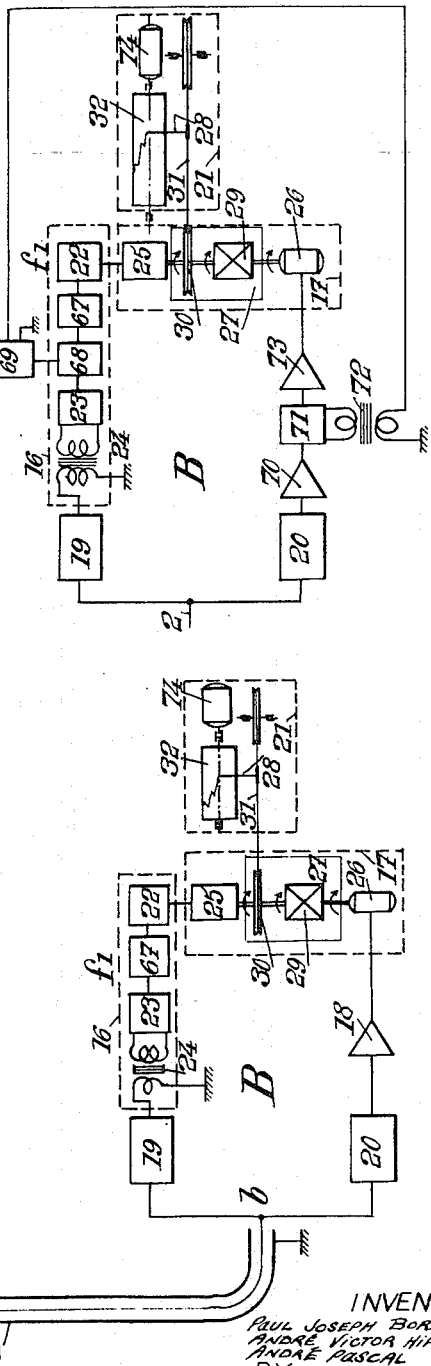
INVENTOR
PAUL JOSEPH BORDENAVE
ANDRÉ VICTOR HIPPOLYTE JOUBER
ANDRÉ PASCAL
BY
Bailey, Stephens & Huettig
ATTORNEYS

United States Patent Office 2,865,196
Patented Dec. 23, 1958

2,865,196

APPARATUS FOR MEASUREMENTS CONCERNING THE VELOCITY OF PROPAGATION OF WAVES, AND IN PARTICULAR SOUND WAVES

Paul Joseph Bordenave, Montfleury, Par la Tronche, and Andre Victor Hippolyte Joubert and Andre Pascal, Grenoble, France, assignors to Etat Francais, represented by Ministère de la Defense Nationale, Paris, France Application December 13, 1956, Serial No. 628,187

Claims priority, application France December 17, 1955

4 Claims. (Cl. 73—53)

The present invention relates to apparatus for measurements concerning the velocity of propagation of a wave in a medium and in particular the velocity of propagation of sound or ultra-sonic waves in a liquid, for instance in the sea.

Our apparatus may be used for indicating variations not only of the velocity of sound or ultra-sound, but also of physical magnitudes upon which said velocity depends, such as the velocity of displacement of the medium in which the travelling, its temperature, the proportion of salt in water, and so on.

The object of our invention is to provide an apparatus of this kind which is better adapted to meet the requirements of practice than those existing at this time.

For this purpose the apparatus according to our invention, which includes a wave transmitter and a wave receiver both placed in said medium at a given distance from each other measured along the path of travel of the wave from said transmitter to said receiver, is characterized by the provision of automatic control means responsive to variations of the phase difference between the transmitted wave and the simultaneously received wave for constantly adjusting the frequency of the transmitted wave to restore said phase difference at any time to a predetermined value if the wave propagation velocity varies as a consequence of variations in the conditions prevailing in said medium, suitable means being provided to translate the frequency variations thus automatically produced into velocity variation indications which can be read directly.

Preferred embodiments of the present invention will be hereinafter described with reference to the accompanying drawings, given merely by way of example and in which:

Fig. 1 diagrammatically shows an apparatus for measuring the velocity of propagation of sound in water.

Fig. 2 separately shows a modification of the portion of said apparatus which is immersed in water.

Fig. 3 shows a modification of the receiving and recording portion of said apparatus.

In the following description with reference to the appended drawings, our invention will be more particularly described as applied to the measurement of variations of the velocity of sound in a liquid, and in particular in the sea, caused by variations of the conditions prevailing in said liquid.

It is known that, in all methods making use of submarine signals, it is of great importance to be aware of variations in the velocity of sound in water. As a matter of fact, lack of accurate information concerning such velocity variations may have a very serious influence upon the efficiency of said methods.

There are known apparatus which indirectly measure the sound velocity in water, that is to say measure it in accordance with the values of the temperature and of the pressure, but the results given by such apparatus are insufficient, and in particular they do not make allowance for variations of other factors upon which the sound velocity depends, and in particular upon the proportion of salt dissolved in water.

There are also apparatus which directly measure the sound velocity or the variations thereof, these apparatus measuring the variations of acoustic phase difference between the wave issuing from an ultra-sound transmitter and that received by a receiver, these two apparatus being located at a fixed distance from each other. In other apparatus of the same kind, the value that is measured is the time interval elapsing between the transmission and the reception of a short signal.

These apparatus are preferable to those in which the sound velocity is measured indirectly, but either they are too complicated or they do not achieve a sufficient accuracy. Some of them necessitate, for connecting the portion of the apparatus which carries the wave generator and the recorder with the portion which is immersed in water, several conductors at least two of which are coaxial lines, and this involves serious difficulties both concerning insulation and weight (for instance when said second mentioned portion is immersed at a variable depth from a ship).

The object of the present invention is to obviate these drawbacks. For this purpose, our invention is based on the following features.

We provide a wave transmitter, for instance an electro-acoustic transmitter transmitting a sound wave of a frequency equal to $f_1$, and on the other hand a corresponding receiver which receives the sound waves after they have travelled over a distance equal to $d$ through water.

According to our invention, we provide automatic control means responsive to variations of the phase difference between the transmitted sound wave and the simultaneously received sound wave for constantly adjusting the frequency of the transmitted sound wave to restore said phase difference at any time to a predetermined value if the sound velocity in the mass of water where the measurements are made varies as a consequence of variations on the conditions prevailing in said mass of water.

As a matter of fact, the phase difference between the electric magnitudes (such as voltages or intensities) which correspond to the outgoing wave at the transmitter and to the arriving wave at the receiver, may be represented by the following formula:

$$\varphi = \frac{2\pi f_1 d}{c} + \psi\left(f_1, \frac{c}{f_1}\right) \tag{1}$$

The first term of this formula represents the phase difference which would correspond to the propagation of a plane wave, whereas the second term is a corrective term taking into account the fact that the true conditions of propagation are different from those corresponding to a plane wave and also that the phase variation depends according to the value of the frequency, upon the electro-acoustic characteristics of the transmitter, of the receiver and of the circuits associated therewith.

In view of the action of the above mentioned automatic control means, we have $\varphi = C_0$, that is to say:

$$\frac{2\pi f_1 d}{c} + \psi\left(f_1, \frac{c}{f_1}\right) = C_0 \tag{2}$$

$C_0$ being a fixed constant value.

If the conditions are such that, $C_0$ being fixed as above stated, to every value of $c$ there corresponds a single value of $f_1$, it will be possible to deduce from the values of $f_1$ the corresponding values of $c$.

Of course, the range of values within which $f_1$ will vary depends upon the value chosen for $d$ and for the range of values of $c$ to be measured.

It is pointed out that in the above described system, where all values are represented electrically, the electrical value representing the fixed phase difference $C_0$ corresponds not only to $C_0$ but also to all phase differences $C_0 + 2K\pi$ where K is a positive or negative integer. In other words, to one value of velocity $c$ correspond several positions of equilibrium of the automatic control means.

In practice no serious difficulty will result from this because suitable values can be chosen for the range of values of $f_1$ and for distance $d$ so as to reduce the number of different possible positions of equilibrium of the automatic control means.

As a matter of fact, if, for the sake of simplification, the corrective term $\psi$ is supposed to have a constant value, it can be deduced from Formula 2 that, $c$ being the true value of the sound velocity, the apparatus may indicate a plurality of values (hereinafter called "multiple determinations") which correspond to the formula $$c + k\frac{c}{n}$$

in which $k$ is equal either to zero or to any positive or negative integer and $n$ is the integer nearest to the quotient of distance $d$ divided by the wavelength (itself equal to $c/f_1$).

Consequently, if it is desired to follow the variations of the sound velocity from a mean value $c$ without discontinuity, the orders of magnitude of $f_1$ and $d$ (which determine $n$) must be chosen such that the maximum variation of the sound velocity from value $c$ is smaller in absolute value than $c/2n$.

On the other hand, Formula 2 shows that the precision of measurement is the higher as $C_0$ is greater, which would lead to choosing high values for $f_1$ and $d$. But this is in opposition with the condition stated in the preceding paragraph. In practice we choose a compromise solution.

By way of non limitative example, if it is desired to measure the variations of the velocity of sound in water within a range of variations of 25 meters per second, with multiple determinations differing from one another by 12.8 m./sec. we may choose $f_1 = 500$ kc. and $d = 0.35$ meter. In these conditions, calculation shows that within most of said range of variations of 25 m./sec., there may be two different determinations. Of course, the apparatus may be used to measure variations of the sound velocity within a wider range, but the number of possible different determinations increases when the width of the range increases.

In other words there are two ways of proceeding.

In one of them, $f_1$ and $d$ are chosen so that, within the range of variations of the velocity that may occur, there is but one possible determination ($n$ is chosen such that the total range of said variations is $c/n$).

In the other one ($n$ being such that the total range within which the velocity may vary corresponds to several times $c/n$) there are several possible determinations for one actual value of the velocity and the apparatus carries multiple graduations. In order to ascertain on which of them the correct value is to be read, a rough measurement shall have to be made through means other than our apparatus.

As a rule, our apparatus includes two portions, to wit:

a. A portion immersed in the medium where the measurement of velocity is to be made, this portion being shown at A on the drawings and including essentially an ultra-sonic transmitter fed at frequency $f_1$ and an ultra-sonic receiver, with means for causing the ultra-sounds to travel a distance equal to $d$ between the transmitter and the receiver. These elements will be arranged so that the value $d$ of the distance remains constant despite variations of position of the apparatus and other possible disturbances, such as variations of temperature, etc. This portion of the apparatus further includes a discriminator device so as to detect the phase difference between the electrical magnitudes corresponding to wave transmission and to wave reception and to deliver an electric magnitude, such for instance as a direct or alternating voltage $v$ proportional to this phase difference.

b. A second portion, shown at B on the drawings, and for instance carried by a ship, which essentially includes a wave generator, automatic control means for varying frequency $f_1$ in response to variations of the above stated voltage $v$, and a recording device.

c. Means for connecting the two above mentioned portions of the apparatus and for transmitting from one to the other the electric factors necessary for its operation, and in particular the feed voltage for generating frequency $f_1$ and voltage $v$, and possibly other factors as hereinafter explained, said means preferably utilizing, for the respective electric magnitudes, different transmission frequencies so that it is possible, by means of suitable selecting means at the input or at the output (such as filters, condensers, etc.), to effect this transmission through a single channel constituted for instance by the wire of a coaxial line the external tube of which connects with the earth suitable parts of A and B.

We will first describe the embodiment of Fig. 1 where it is supposed that the two frequencies serving for transmission between the two portions A and B of the apparatus are respectively frequency $f_1$ and frequency zero, which means that the voltage $v$ supplied by the discriminator device is a direct voltage.

The portion A of the apparatus includes for instance:

(1) An ultra-sonic transmitter 1 which receives alternating current of frequency $f_1$ through the wire 2 of the coaxial tube T the envelope of which is connected with the casing of portion A and with that of portion B, said current passing, before it reaches transmitter 1, through an adaptation transformer 4 which includes a winding 12 for the feed of the discriminator device which will be referred to hereinafter;

(2) An ultra-sonic receiver 5 capable of receiving sounds after they have travelled a distance $d$ imposed by means such as 6, 7 which will be described hereinafter, the transmitter and receiver being preferably arranged in such manner that their resonance frequency is close to frequency $f_1$, which permits of giving the maximum value to the voltage supplied by the receiver. It should be further noted that the amplitude varies but little as a function of $f_1$ when the frequency is close to the resonance value and that the phase variation between the transmitter and the receiver is generally, in these conditions, substantially linear as a function of $f_1$, provided that the amplitude of the variations of $f_1$ is compatible with the sharpness of resonance of the whole (a condition which should also be complied with when the system includes circuits through which flows an auxiliary frequency $f_2$, as hereinafter described);

(3) A phase discriminator 10 which may be of any suitable type and which receives for instance, on the one hand from 12 a voltage of the same phase as that supplied to transmitter 1, or having a constant phase difference therewith, and on the other hand from 11 the voltage supplied by the receiver, so as to obtain, at the output of said discriminator, a direct voltage $v$ which controls the automatic control means; and (4) Selecting means to achieve, at the common point $a$ on wire 2, a separation of the electrical factors transmitted or to transmit, in this case the alternating current of frequency $f_1$, and the direct current $v$, these means consisting for instance in suitable filter circuits, condensers, and being diagrammatically illustrated at 3 and 14.

The means for causing the sound wave to travel a constant distance $d$ are arranged so that the time elapsing during the travel from 1 to 5 is practically not modified by the speed of displacement of body A with respect to the surrounding medium, that is to say is generally small with respect to the velocity of sounds or ultra-sounds in this medium.

For instance, in the embodiment shown by the drawings, and at least when the displacements of body A in water are in directions making relatively small angles with the plane which passes through the axis $x_1x_2$ of the immersed body and is perpendicular to the plane $y_1y_2z_1z_2$, this condition is complied with by constituting the path of travel of the sound wave by two parallel lines $y_1y_2$ and $z_1z_2$ along which the wave travels in opposed directions respectively, said lines being at a small distance $e$ from each other, this result being obtained by making use of plane acoustic mirrors at 45° such as shown at 6, 7.

It is advisable to have the distance $e$ between $y_1y_2$ and $z_1z_2$ as small as possible so as to reduce to a minimum the error that might be caused by a transverse displacement of body A with respect to the liquid in the plane $y_1y_2z_1z_2$. In the example that is shown, $e$ is for instance equal to 4 cm.

The back face of the mirrors and the piece that carries them may be streamlined so as to reduce eddies as might be caused by the displacement of water with respect to the apparatus.

If it is desired to eliminate the effect of transverse displacements of water with respect to the body A of the apparatus, the latter may include two transmitters 1, 9 and two receivers 8, 5, such as shown by Fig. 2, forming two parallel paths of travel in opposition with each other, 8—9 acting as an electro-acoustic relay, the only lines of travel in the liquid being 1—8 and 9—5 to produce the difference of phase resulting from sound propagation in said liquid.

It goes without saying that the transmitter or transmitters and receiver or receivers and also the mirrors on body A must be fixed in such manner that the displacements of these parts with respect to one another may be considered as negligible in normal conditions of operation. In particular, the supports of mirrors 6, 7 may be constituted so that temperature variations undergone by the apparatus cause a negligible variation of the path of travel.

The body A (of course not including the space between elements 1, 5 and mirrors 6, 7) will be watertight at the maximum pressure at which the measurements are to be made. This body may be immersed or fixed at a point of the medium where said measurements take place, or it may be towed by a ship. In this case, its envelope is streamlined and includes stabilizing means, suspension means, and so on, so that it has a given path of travel with respect to the ship.

The portion B of the apparatus essentially includes the following elements:

An oscillator 16 to generate alternating current at frequency $f_1$;

Electro-mechanical means 17 to perform an automatic control of generator 16 so that the phase difference between the transmitted wave and the received wave is kept constant, said automatic control means being operated by the voltage $v$ supplied from body A through the coaxial connecting means T, 2;

Selector means to separate the electric values transmitted or to transmit, such as filters, condensers 19, 20, etc. (in this case, said means serve to filter frequency $f_1$ on the one hand, and the direct voltage $v$ on the other hand);

Means 18 for amplifying voltage $v$,

And a device 21 for recording the variations of $f_1$ and therefore consequently the variations of the velocity $c$.

Of course the apparatus includes the necessary sources of electric current.

The wave generator 16 includes for instance:

An oscillator 22 arranged so that the variations of its frequency $f_1$ for reasons other than the action of the automatic control means above referred to, are as small as possible, in view of the accuracy of measurement that is required.

And an output stage including a vacuum tube 23 which receives the voltage of frequency $f_1$, preferably through a connection tube 67 arranged in such manner that the power it collects from oscillator 22 is as low as possible so that the stability of said oscillator is not altered (said tube 67 being for instance a cathode follower tube), an adapting transformer 24 being preferably provided after tube 23.

As for the electro-mechanical automatic control device 17, it may include for instance the following elements:

A variable electric element 25 cooperating with oscillator 22 so that displacement of element 25 causes the frequency $f_1$ to be varied, the limit positions of this element 25 (which consists for instance of a condenser) being determined so that the above mentioned Equation 2 is complied with for all values of the velocity $c$ within the range in which the apparatus is to operate;

A motor 26 to which is fed a voltage $v'$ depending upon the voltage $v$ supplied by discriminator 10, this voltage $v'$ being for instance delivered at the output of an amplifier such as 18, and said motor being advantageously of the direct current type when the voltage $v'$ is itself a direct voltage; and Means such as 29, 30 for transmitting the movement of motor 26 both to the variable electric element 25 and to the stylus 28 of the recording apparatus 21, said means determining the law of variation of the displacements of element 25 as a function of the frequency $f_1$.

We establish this law in a manner favorable to the obtainment of the desired result, for instance by acting upon 25 through suitable cams or by choosing an element 25 which has a suitable law of variation, 25 being for instance a variable condenser the plates of which have a suitable outline.

It is often interesting to have the variations of velocity translated according to a linear scale.

This result may be obtained as above stated, but it may be easier to choose and to determine the elements which serve to compare the phases at the transmitter and at the receiver respectively in such a manner that the variation of $\psi$ as a function of $f_1$ is such that the relation between $f_1$ and $c$ is linear within the limits of approximation that are chosen.

This is the easier as the range within which the variations of $c$ are to be measured is smaller.

In these conditions, in order to have a linear law of variation of velocity, it suffices to have the displacements of the stylus of the recording device linear as a function of the variations of $f_1$.

In this case the approximation obtained, when use is made of a condenser 25 the capacity of which varies linearly, is in many cases sufficient. It may be improved by having 25 actuated through a simple nonlinear mechanical device such for instance as an eccentric pulley and a cable 31.

We thus obtain a system (Fig. 1) which permits of reading on the recording apparatus 21 the variations of velocity $c$, the drum 32 of said apparatus being driven in this case at constant speed by a motor 74 (it will be seen hereinafter that this recording of the variations of the velocity $c$ as a function of time represents only one possibility of our invention).

We will now describe another modification of said invention.

First, instead of using, as in the embodiment of Fig. 1, a voltage $v$ which is a direct voltage supplied by a discriminator 10 and also transmitted as a direct voltage to motor 26, we may use a supplementary frequency $f_2$ capable for instance of modulating frequency $f_1$ so that the two transmissions, to wit that of frequency $f_1$ from A to B, and that of voltage $v$ from B to A, take place respectively on frequencies $f_1$ and $f_2$ different from each other, and which are separated at the input and the output, at points such as $a$ and $b$, by a selective circuit such as 3, 14, 19, 20 suitably arranged, and for instance constituted by wave traps tuned to the frequencies to be stopped. The whole then permits of using a single coaxial tube T, 2 with the desired accuracy.

In this case, the voltage $v$ of frequency $f_2$ supplied by discriminator 10 may, after amplification:

Either be used directly in motor 26 which, in this case, will be for instance a two-phase alternating current motor one winding of which is fed with alternating voltage $v'$ and the other winding of which is fed with an auxiliary voltage in quadrature with the preceding one, and also of frequency $f_2$, Or be rectified in such manner that the sign of the direct voltage that is obtained changes when the phase of $v$ passes through the value corresponding to the condition expressed by Equation 2. The direct voltage $v'$ thus obtained will be applied to motor 26 which in this case also is a direct current motor as in the case of Fig. 1.

Fig. 3 shows, by way of indication, a modification of the arrangement of Fig. 1 in the case where a second frequency $f_2$ is used.

According to this modification, we provide at 69 a local oscillator which acts upon a modulator 68 interposed between tubes 67 and 23, said modulator being for instance constituted by a tube including a modulating electrode which receives frequency $f_2$.

The voltage of frequency $f_1$ modulated by $f_2$ is sent from B toward A and separated after point $a$ respectively by the selecting circuits 3 and 14, so that only frequency $f_1$ passes into the sound transmitter, whereas the voltage $v$ at frequency $f_2$ delivered by discriminator 10 is returned to body B through circuit 14 and cable T, 2. At point $b$ the same selection is performed, only the voltage $v$ at frequency $f_2$ being allowed to pass through the selecting circuit 20. In a general manner, the selecting circuits such as 3, 14, 19, 20 will be constituted by filters or networks including series circuits, shunt circuits or combinations of series and shunt circuits, or again combinations including circuits coupled together, etc. Transformers may be included in circuits 14 and 20.

The voltage received at B, after it has passed through circuit 20 is practically free from frequency $f_1$, so that the ratio $v/v_1$ of the values at the input and at the output is practically independent of the amplitude of the voltage of frequency $f_1$.

Said voltage $v$, after it has been filtered through the circuit 20, is received in an amplifier 70 and is fed therefrom (in the case of Fig. 3 where it is supposed that use is made of a direct current motor 26) to a rectifier 71, for instance of the symmetrical type, which delivers a direct voltage the sign of which varies when the phase of $v$ passes through the value for which the condition expressed by Equation 2 is complied with. For this purpose, there is supplied at 72 a reference alternating voltage at frequency $f_2$, supplied from generator 69.

Finally, the direct voltage thus obtained is further amplified at 73 before it is admitted to motor 26.

It should be noted that, in an automatic control system as above described with reference to Figs. 1 to 3, we may apply all known arrangements concerning the amplifiers that are used in connection with the servomechanisms. Thus, the amplifiers such as shown at 18 on Fig. 1 and at 70 and 73 on Fig. 3 may include negative feed back circuits by means of which it is possible to subtract from the input voltage of one of the amplifier stages a voltage which depends upon the output voltage, the speed and the acceleration of motor 26, in view of the desired performances.

In the preceding description, we have only considered the case where the recording at 21 takes place as a function of time. But the invention also applies where the recording is made as a function of another variable or magnitude, for instance as a function of the variations of a physical magnitude such as temperature, hydrostatic pressure of water, etc., in which case the unwinding of the sheet of paper carried by drum 32 takes place according to the variations of said last mentioned magnitude.

Among the many advantages of the apparatus according to our invention, we will indicate the two following ones which are considered to be particularly important:

This apparatus achieves a direct recording of the variable or variables to be measured, in the form of curves which are easy to read.

Furthermore, the connection between the two portions of the apparatus is greatly simplified owing to the possibility of utilizing a single coaxial line.

Of course, it should be well understood that the two portions A and B of the apparatus might be directly mounted together, for instance if the apparatus were fixed on a submarine boat.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. An apparatus of the type described for measurements relative to sound wave propagation in a liquid medium which comprises, in combination, a transmitter placed in said medium capable of emitting a wave therein in response to an electric oscillation imparted to the input thereof, a receiver placed in said medium and sensitive to said wave, said receiver being capable of delivering at its output an electric oscillation in response to said wave striking it, means for causing said wave to travel at any time a given distance between said transmitter and said receiver through said medium, a device having its input connected both with the input of said transmitter and with the output of said receiver and capable of delivering at its output an electric magnitude variable in accordance with variations of the phase difference between the electric oscillation at the input of said transmitter and the electric oscillation at the output of said receiver, a variable frequency electric oscillator, movable means operatively connected with said oscillator for varying the frequency thereof, electric motor means for operating said movable means, means for electrically connecting the output of said oscillator with the input of said transmitter and the output of said device with said motor means, said device and said motor means being arranged to vary the frequency of said oscillator in response to variations of said phase difference to keep said phase difference at a fixed predetermined value irrespective of such variations, indicating means operative by said motor means, said transmitter and said receiver being located side by side and said means for causing said wave to travel a given distance through said medium including another receiver and another transmitter located side by side and oppositely said first mentioned transmitter and receiver respectively, and electric means for connecting the output of said second mentioned receiver with the input of said second mentioned transmitter.

2. An apparatus of the type described for measurements relative to sound wave propagation in a liquid medium which comprises, in combination, a transmitter placed in said medium capable of emitting a wave therein in response to an electric oscillation imparted to the input thereof, a receiver placed in said medium and sensitive to said wave, said receiver being capable of delivering at its output an electric oscillation in response to said wave striking it, means for causing said wave to travel at any time a given distance between said transmitter and said receiver through said medium, a device having its input connected both with the input of said transmitter and with the output of said receiver and capable of delivering at its output a voltage variable in accordance with variations of the phase difference between the electric oscillation at the input of said transmitter and the electric oscillation at the output of said receiver, the above mentioned elements being grouped together to form a unit for immersion in said liquid medium, a variable frequency electric oscillator, movable means operatively connected with said oscillator for varying the frequency thereof, electric motor means for operating said movable means, the three last mentioned elements being located at a distance from said unit, a coaxial line for electrically connecting said unit with said oscillator and said motor means, said coaxial line including an outer tube which is earthed and a wire in said tube, frequency selecting means at both ends of said wire, those of said selecting means which are at the wire end located in said unit being inserted between on the one hand said last mentioned wire end and on the other hand the input of said transmitter and the output of said device respectively, those of said selecting means which are at the other end of said wire being located between on the one hand said last mentioned wire end and on the other hand said oscillator and said motor means respectively, said frequency selecting means being arranged to separate two distinct electric channels, one between the output of said oscillator and the input of said transmiter and the other between the output of said device and said motor means, said device and said motor means being arranged to vary said frequency in response to variations of said phase difference to keep said phase difference at a fixed predetermined value irrespective of such variations, and indicating means operative by said motor means.

3. An apparatus according to claim 2 in which said device is arranged to give at its output a direct voltage transmitted as such through said line.

4. An apparatus according to claim 2 further including means for producing an alternating electric voltage of a frequency different from that of said oscillator and modulating the oscillation from said oscillator by means of said alternating voltage, said frequency selecting means being arranged to transmit through said wire toward said motor means an alternating voltage at the second mentioned frequency modulated by the voltage delivered at the output of said device.

References Cited in the file of this patent

UNITED STATES PATENTS

| | | |
|---|---|---|
| 2,099,687 | Hartig | Nov. 23, 1937 |
| 2,593,351 | Shannon | Apr. 15, 1952 |
| 2,746,480 | Hildyard | May 22, 1956 |
| 2,750,794 | Downs | June 19, 1956 |
| 2,756,404 | Anderson et al. | July 24, 1956 |

OTHER REFERENCES

National Bureau of Standards, Technical News Bulletin, vol. 39, No. 7, July 1955, pp. 89 and 90.